(12) United States Patent
Greenstein et al.

(10) Patent No.: US 7,788,323 B2
(45) Date of Patent: Aug. 31, 2010

(54) METHOD AND APPARATUS FOR SHARING INFORMATION IN A VIRTUAL ENVIRONMENT

(75) Inventors: Bret Alden Greenstein, Brookfield, CT (US); Wesley Janming Ho, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/531,777

(22) Filed: Sep. 14, 2006

(65) Prior Publication Data

US 2007/0011273 A1   Jan. 11, 2007

Related U.S. Application Data

(62) Division of application No. 09/666,074, filed on Sep. 21, 2000, now abandoned.

(51) Int. Cl.
G06F 15/16   (2006.01)

(52) U.S. Cl. .................. 709/204; 715/513; 715/757; 715/744

(58) Field of Classification Search .......... 709/204, 709/205, 217, 218; 715/705, 706, 757
See application file for complete search history.

(56) References Cited

U.S. PATENT DOCUMENTS

| | | | |
|---|---|---|---|
| 5,021,976 A | 6/1991 | Wexelblat et al. | |
| 5,224,160 A | 6/1993 | Paulini et al. | |
| 5,727,155 A | 3/1998 | Dawson | |
| 5,802,531 A | 9/1998 | Lamiraux et al. | |
| 5,850,352 A | 12/1998 | Moezzi et al. | |
| 5,852,443 A | 12/1998 | Kenworthy | |
| 5,864,342 A | 1/1999 | Kajiya et al. | |
| 5,880,731 A * | 3/1999 | Liles et al. ............ | 715/758 |
| 5,880,737 A | 3/1999 | Griffin et al. | |
| 5,923,330 A | 7/1999 | Tarlton et al. | |
| 5,933,829 A | 8/1999 | Durst et al. | |
| 5,956,028 A | 9/1999 | Matsui et al. | |
| 5,966,130 A | 10/1999 | Benman, Jr. et al. | |
| 5,969,724 A | 10/1999 | Berry et al. | |
| 6,020,885 A * | 2/2000 | Honda ................. | 715/757 |
| 6,025,846 A | 2/2000 | Chudley | |
| 6,119,147 A * | 9/2000 | Toomey et al. ......... | 709/204 |
| 6,138,119 A | 10/2000 | Hall et al. | |
| 6,175,842 B1 | 1/2001 | Kirk et al. | |
| 6,226,669 B1 * | 5/2001 | Huang et al. .......... | 709/204 |
| 6,253,167 B1 * | 6/2001 | Matsuda et al. ........ | 703/11 |
| 6,329,986 B1 | 12/2001 | Cheng | |
| 6,346,938 B1 | 2/2002 | Chan et al. | |
| 6,466,970 B1 | 10/2002 | Lee et al. | |
| 6,493,001 B1 * | 12/2002 | Takagi et al. .......... | 715/759 |
| 6,496,851 B1 * | 12/2002 | Morris et al. .......... | 709/204 |
| 6,577,306 B2 | 6/2003 | Matsuda | |

(Continued)

*Primary Examiner*—Michael Won
(74) *Attorney, Agent, or Firm*—Yee & Associates, P.C.; William H. Steinberg

(57) ABSTRACT

A distributed data processing system provides a virtual workplace environment. The virtual workplace environment may be a three-dimensional model of an office, a conference room, or an entire office building complex. Participants are represented by three-dimensional avatars, which move within the virtual environment. Participants may also share data within the virtual environment. Two-dimensional data may be projected onto the surface of a three-dimensional object within the environment, such as a wall. Three-dimensional data may be rendered within the environment for the participants to inspect.

3 Claims, 15 Drawing Sheets

U.S. PATENT DOCUMENTS

| | | | |
|---|---|---|---|
| 6,611,822 B1 * | 8/2003 | Beams et al. ................. 706/11 |
| 6,734,885 B1 | 5/2004 | Matsuda |
| 6,785,708 B1 * | 8/2004 | Busey et al. ................. 709/204 |
| 6,801,930 B1 * | 10/2004 | Dionne et al. ............... 709/205 |
| 6,933,938 B1 | 8/2005 | Matsuda |
| 6,975,315 B2 | 12/2005 | Matsuda |
| 6,975,316 B2 | 12/2005 | Matsuda |
| 6,982,709 B2 | 1/2006 | Matsuda |
| 7,007,065 B2 | 2/2006 | Matsuda |
| 7,139,796 B2 * | 11/2006 | Rekimoto et al. ........... 709/204 |
| 2001/0037367 A1 * | 11/2001 | Iyer ............................ 709/204 |
| 2002/0002586 A1 * | 1/2002 | Rafal et al. .................. 709/205 |
| 2002/0049827 A1 * | 4/2002 | Dionne et al. ............... 709/217 |
| 2002/0052918 A1 * | 5/2002 | Rekimoto et al. ........... 709/204 |
| 2002/0113820 A1 | 8/2002 | Robinson et al. |
| 2005/0015725 A1 * | 1/2005 | Matsuda ..................... 715/706 |

* cited by examiner

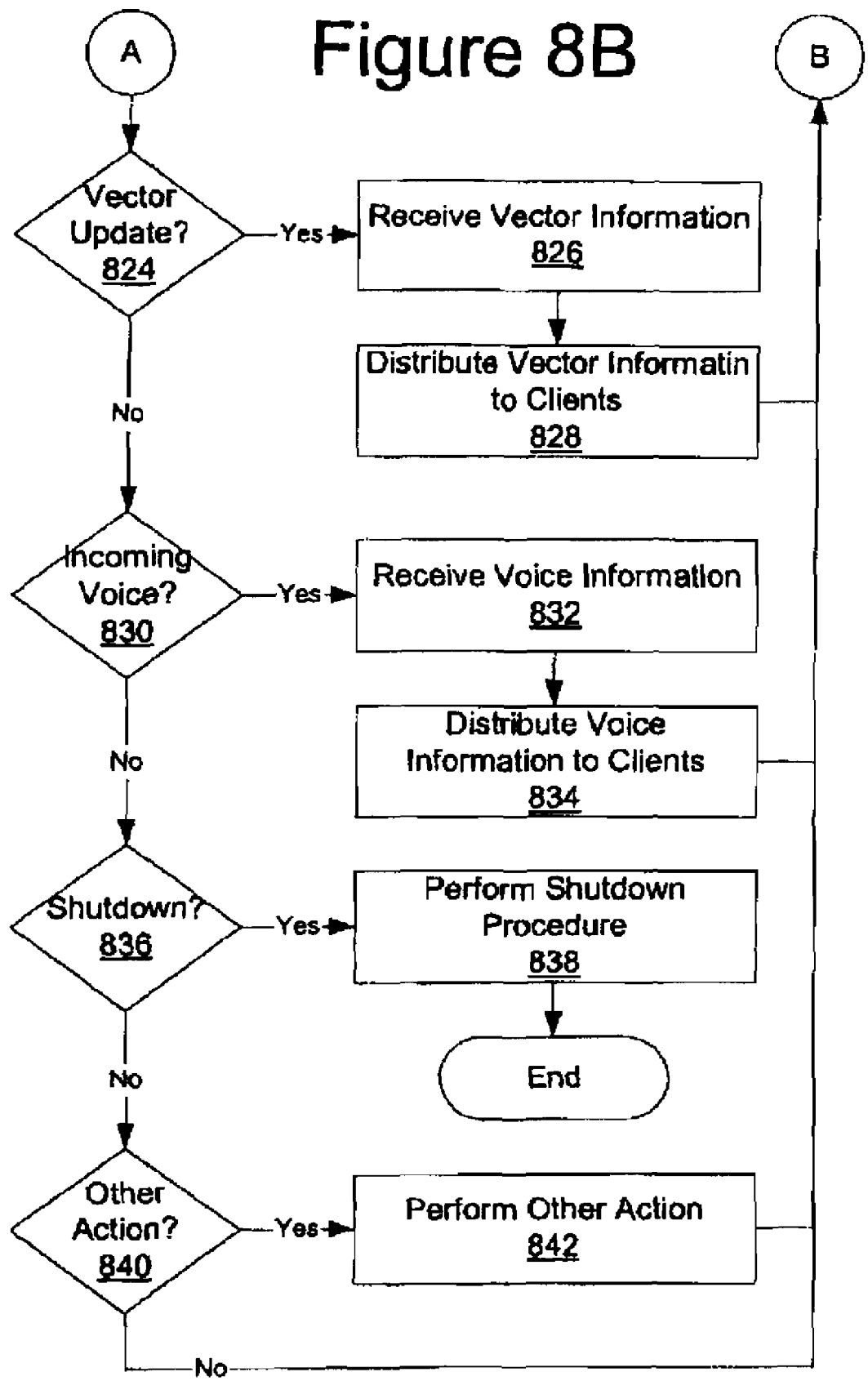

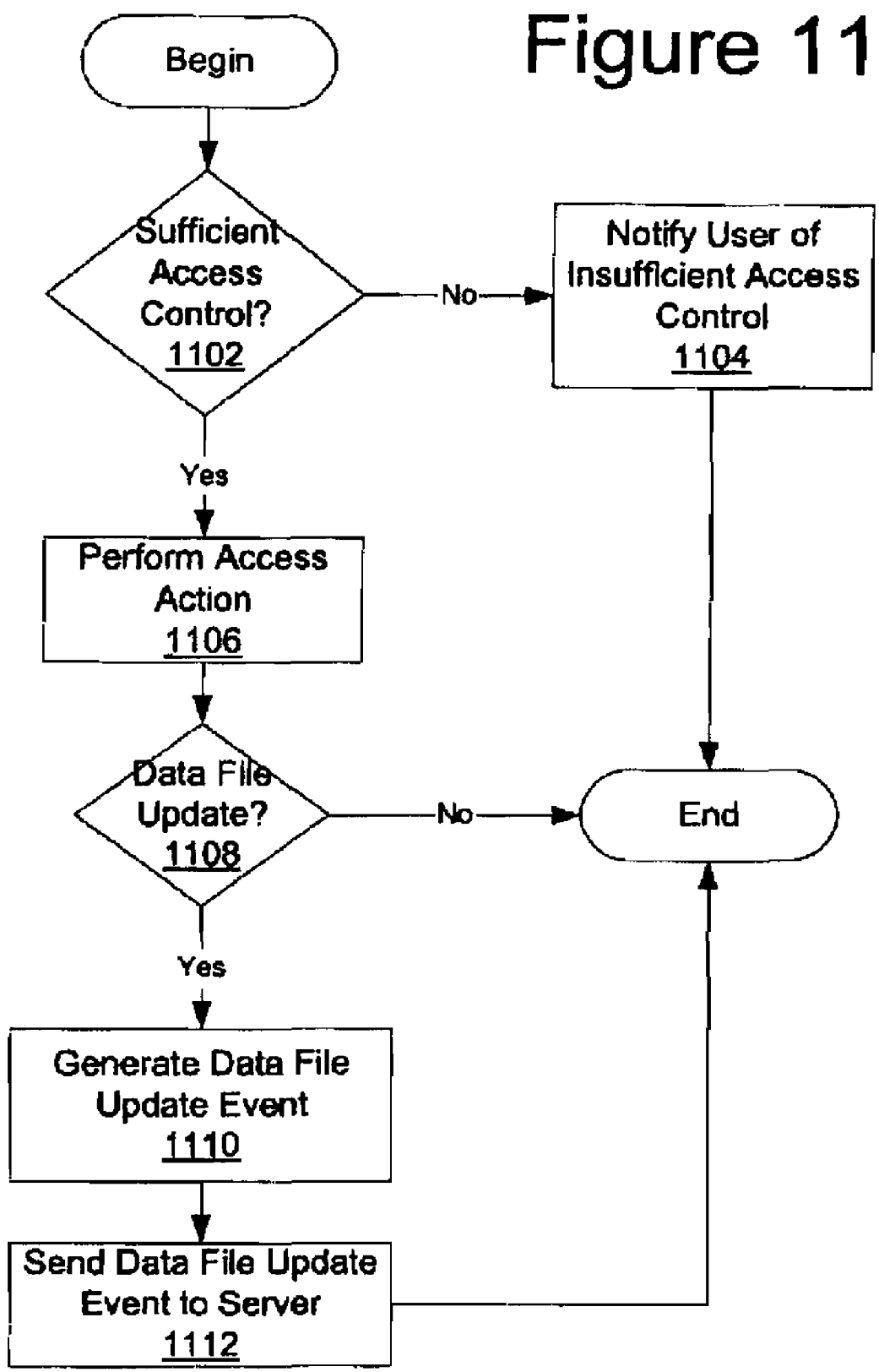

METHOD AND APPARATUS FOR SHARING INFORMATION IN A VIRTUAL ENVIRONMENT

This application is a divisional of application Ser. No. 09/666,074, filed Sep. 21, 2000 now abandoned, status pending, which is herein incorporated by reference.

BACKGROUND OF THE INVENTION

1. Technical Field

The present invention relates to an improved data processing system and, in particular, to a method and apparatus for enabling multiparty interactivity in a distributed processing system. Still more particularly, the present invention provides a method and apparatus for providing a virtual workplace with fully rendered three-dimensional models.

2. Description of Related Art

The worldwide network of computers commonly known as the "Internet" has seen explosive growth in the last several years. Mainly, this growth has been fueled by the introduction and widespread use of the worldwide web (WWW) of computers providing entertaining and educational content, as well as advertisements and electronic storefronts, to users of so-called "web browsers." A web browser is a program that is executed on a graphical user interface (GUI) in a client computer to seamlessly load documents from a network server via the Internet and display them by means of the GUI.

One area that has seen slow growth over the years is personal communication over the Internet. Current telecommuting and telepresence technology is focused on video conferencing. Even with the innovations in high-speed modems, broadband Internet access, data compression, and streaming video and audio, video conferencing uses significant network and system resources to provide live motion of a person. Often, due to limited available bandwidth, video conferencing is limited to person-to-person communication, rather than tens of people gathering together, as in a typical business or organizational meeting.

Furthermore, in a video conference a person typically sits still in front of a camera with very limited movement, except for the mouth. The speed of transmission is insufficient to keep pace with the speed of mouth movement in standard speech. Video adds limited value beyond providing a static picture of a participant. Emotional expression is useful; however, emotion is more efficiently conveyed through voice information and body motion.

Still further, video conferencing does little to place the participants in the same environment. The participants do not interact with one another except by speech and facial expressions. Application sharing and information and data exchange take place in a separate interface, which detracts from eye contact, a strong point of video conferencing.

In the meantime, the gaming industry has inspired several advancements in technology. The popularity of first-person perspective games is responsible for three-dimensional (3D) graphics engines capable of producing lifelike models, fast rendering, smooth motion, and realistic environments. Current first-person perspective games also take advantage of these 3D graphics engines and 3D positional audio to provide a sense of immersion into the virtual world created for the game. In addition, video cards with 3D graphics accelerators have become commonplace. In fact, many motherboards are manufactured with built-in 3D graphics accelerators and 3D sound capability.

Another trend in the computer video game industry is to provide multiplayer video games. Using a massively multi-player computer game, a player may connect to a server and play with or against thousands of other players. Multiplayer computer games make use of the processing power of the client computers to render 3D models of objects to create a virtual environment as well as all of the participants within the environment. This heavy use of distributed processing reduces the amount of data transmitted through the server and, thus, the network.

Typically, a participant controls the movement of a character, which is a three-dimensional representation or "avatar" of the participant. This movement is communicated to the server as a vector made up of a current position, a direction, and a speed. The movement of other objects, such as projectiles, is communicated in the same manner. The server then distributes this movement information to the other clients, which handle the movement of the objects appropriately. With the minimal use of bandwidth to communicate movement, multiplayer games are designed to operate effectively with only a 28.8 kbaud modem connection and still have enough bandwidth to handle thousands of players connected to the same server or to supplement the experience with voice communication.

Online multiplayer games provide a feeling of immersion into a virtual world, which creates a forum for role-playing, conflict, and social interaction. However, online multiplayer games do not provide an environment for serious exchange of data or ideas, other than by text chat or voice communication. Therefore, it would be advantageous to provide a method and apparatus for sharing information in a virtual environment.

SUMMARY OF THE INVENTION

The present invention provides a virtual workplace environment similar to an online gaming environment using a client/server model. The virtual workplace environment may be, for example, a three-dimensional model of an office, a conference room, or an entire office building complex. Participants are represented by three-dimensional avatars, which move within the virtual environment. Participants may communicate by text chat or messaging or by voice communication.

Participants also may share data within the virtual environment. Three-dimensional data, such as an architectural design or three-dimensional medical image, may be rendered within the environment for the participants to inspect and "walk around." Three-dimensional data may be the environment itself, such as an interior design, architectural design, or landscape, for participants to walk around or through, or even "fly" over and around. Three-dimensional data, such as a 3D chart or graph, may also be rotated about one, two, or three axes.

Two-dimensional data, such as a word processing document or spreadsheet, may be projected onto a surface, such as a wall or tabletop. The virtual workplace interface of the present invention communicates with the appropriate application software to render the data into a format usable in the virtual environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A and 8B are flowcharts illustrating the general operation of a virtual workplace server in accordance with a preferred embodiment of the present invention;

FIG. 11 is a flowchart illustrating the operation of a shared data access process according to a preferred embodiment of the present invention.

DETAILED DESCRIPTION OF THE PREFERRED EMBODIMENT

Figure 1:
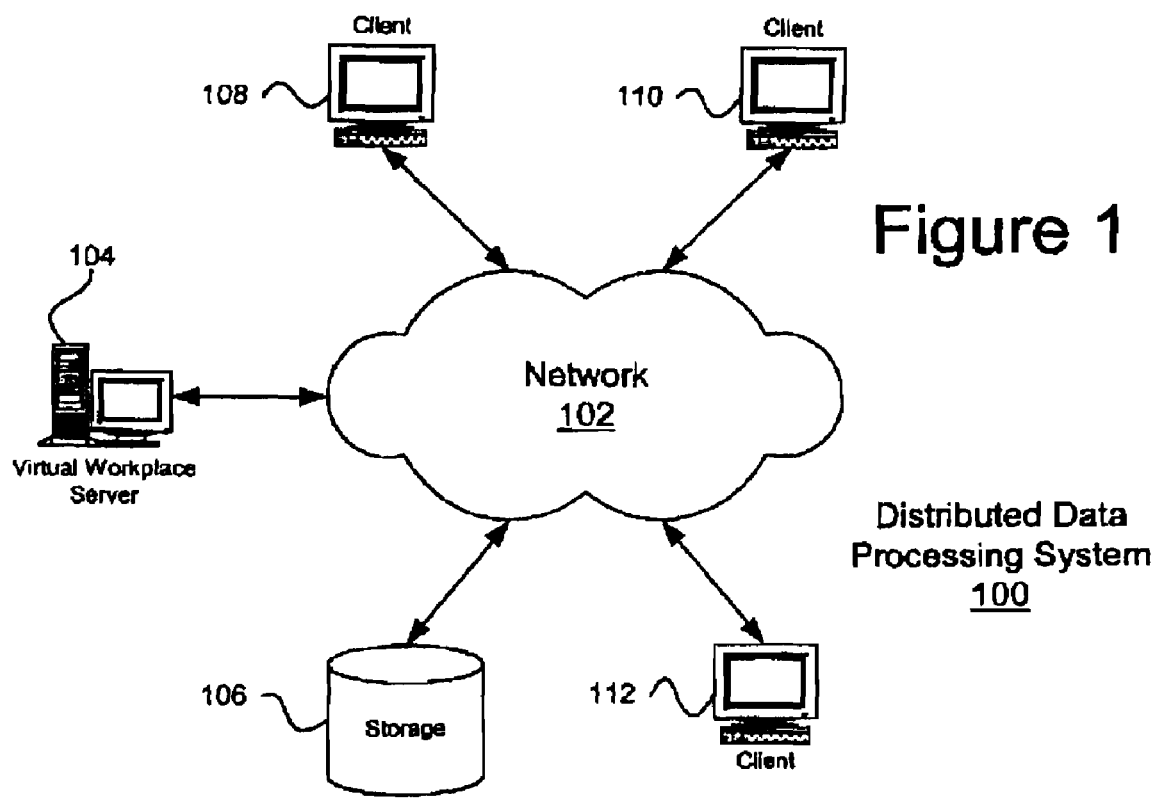
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
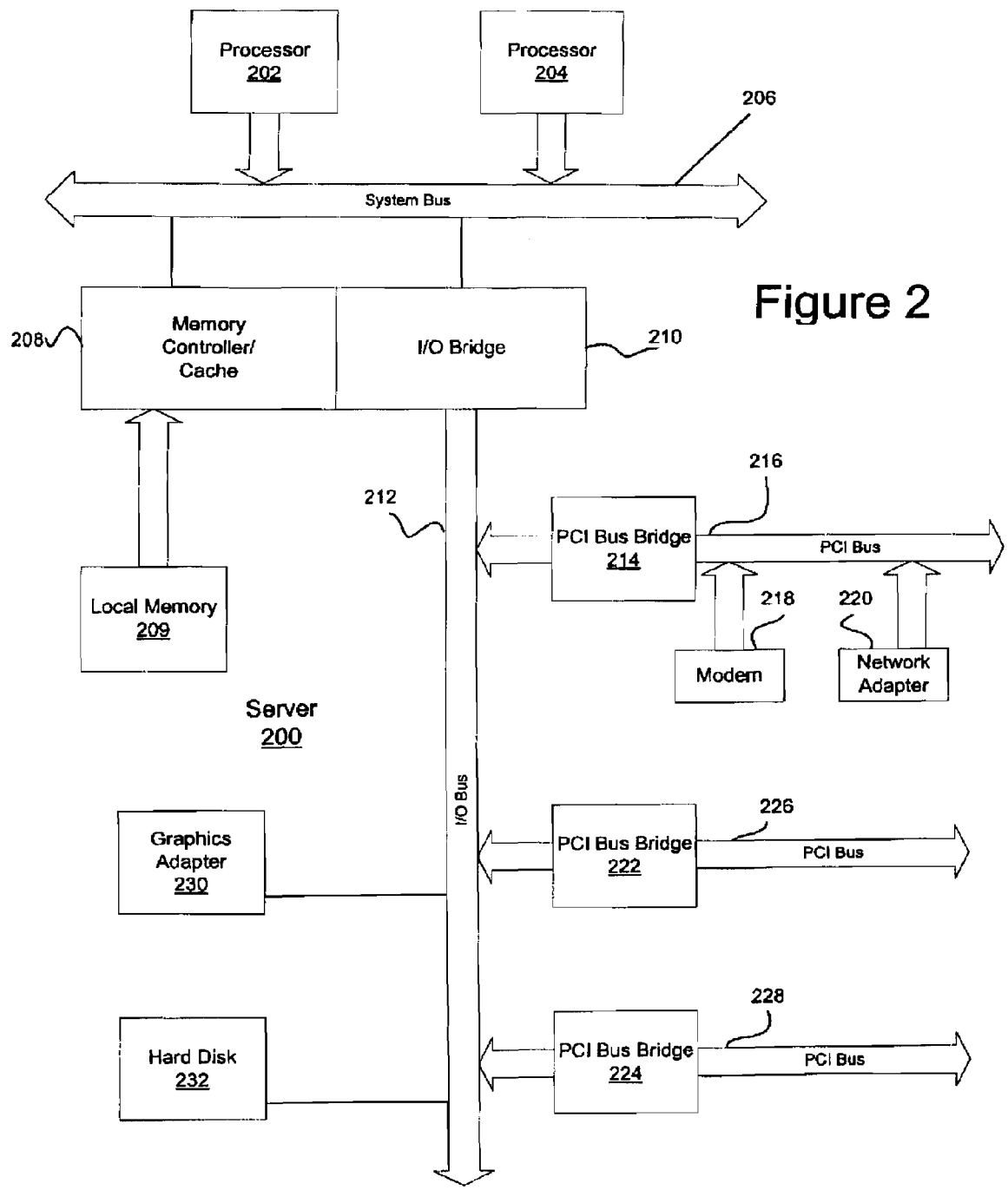
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
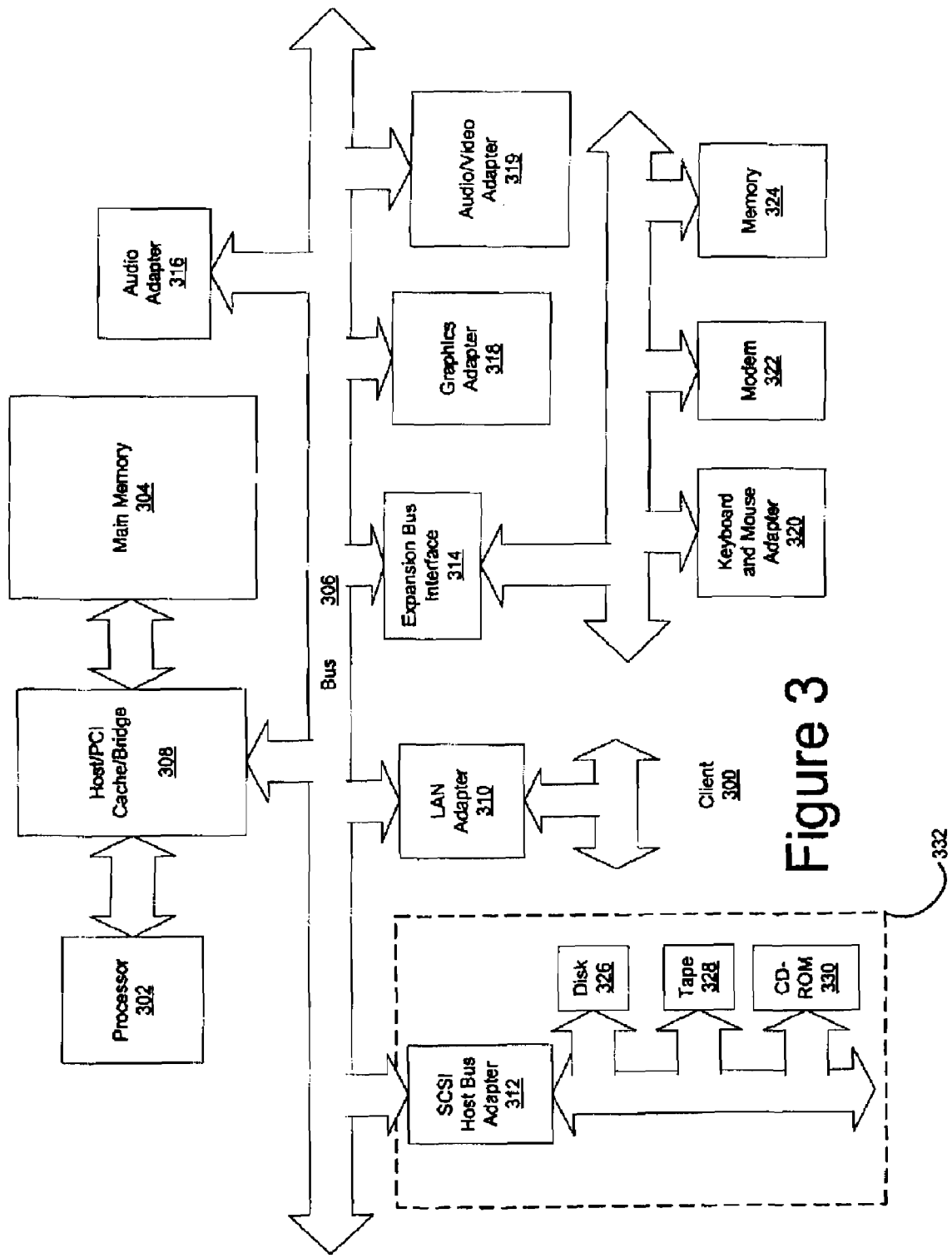
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference again to FIG. 1, a specific client/server arrangement is presented according to a preferred embodiment of the present invention. Data processing system 100 includes network 102, which connects clients 108, 110, 112 to virtual workplace server 104.

Each client runs virtual workplace client software with a 3D graphics engine and uploads movement vector information, voice information of the participant, and possibly other data associated with the respective client to a virtual workplace server. The virtual workplace client software renders a 3D model of a virtual workplace environment. The virtual workplace environment may be a realistic model of an actual office building or may contain elements with no real world counterpart. For example, a meeting room may be created and the size of the room may be determined based on the number of participants. A meeting room may also be crated with a large white wall for presentation of documents. In fact, a meeting room may be created, which is not a room at all. For example, a large empty space may be created with no walls or ceiling so that participants may "fly" around a 3D model, such as a product design or 3D medical image.

The virtual workplace servers supply 3D object updates, as well as vector information and voice information, to the clients, which, in turn, modify the virtual workplace accordingly in the virtual workplace client software. For example, if a new meeting room is created in the virtual environment, a copy of the 3D object associated with the meeting room is downloaded from the virtual workplace server hosting the meeting to each participant's client machine. As another example, a new employee may create a new participant avatar. A participant avatar may simulate the physical properties of the participant, such as hair length, hair color, height, etc. The present invention may also allow a photographic image of the participant to be superimposed onto a participant avatar. The 3D model of each participant avatar must exist at each client to be rendered by the 3D graphics engine. Furthermore, each time a participant moves or talks, that participant's client uploads vector information or voice information to the virtual workplace server, which, in turn, relays that information to the remaining participants. The virtual workplace server also relays shared data between clients.

Figure 4:
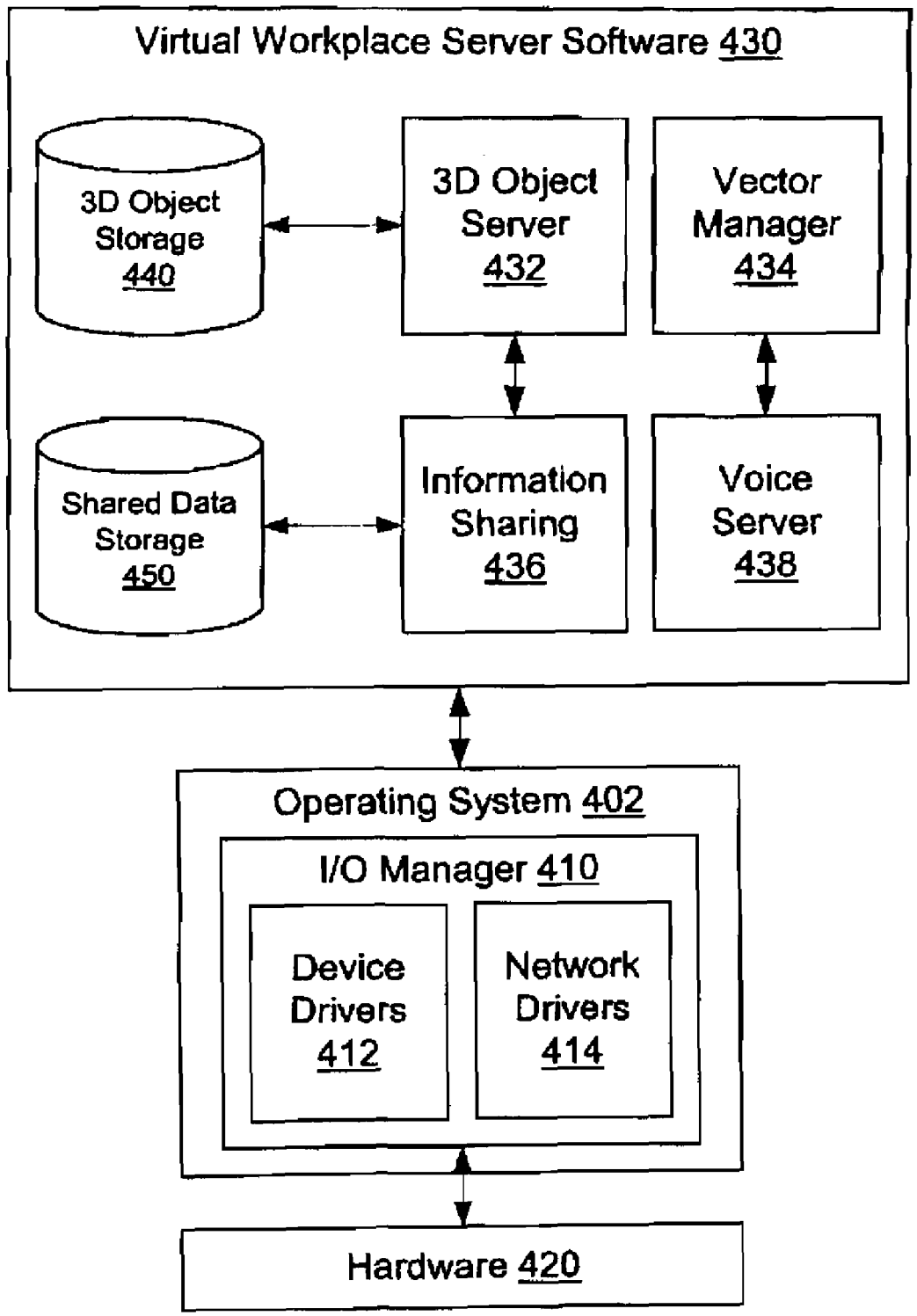
FIG. 4 is a block diagram illustrating the software organization within a virtual workplace server in accordance with a preferred embodiment of the present invention.

With reference now to FIG. 4, a block diagram is shown illustrating the software organization within a virtual workplace server in accordance with a preferred embodiment of the present invention. The organization shown may be embodied within virtual workplace server 104 shown in FIG. 1. Operating system 402 communicates with virtual workplace server software 430. The operating system communicates with hardware 420 directly through input/output (I/O) manager 410. I/O manager 410 includes device drivers 412 and network drivers 414. Device drivers 412 may include a software driver for a printer or other device, such as a display, fax modem, sound card, etc. The operating system receives input from the user through hardware 420. Virtual workplace server software 430 sends information to and receives information from a network by communicating with network drivers 414 through I/O manager 410.

Virtual workplace server software 430 includes 3D object server 432, a vector manager 434, information sharing module 436, and voice server 438. 3D object server 432 distributes objects and updates from 3D object storage 440 to the clients. New objects and updates have associated therewith a time and date stamp. Each client, upon logging into the virtual workplace server, will retrieve new objects and updates, the time and date of which are after the time and date of the last login. A client may also upload 3D objects to the server. For example, a participant may create a specialized meeting room. A participant may also create a 3D object, such as a floating slate on which a document is to be projected. In such a case, the 3D object server acquires the object or objects and stores them in 3D object storage 440 for subsequent distribution to other participants.

Vector manager 434 receives movement information in the form of vectors from each client and distributes this information to the remaining clients. When a participant indicates movement within the virtual environment by manipulation of an input device, such as cursor keys on a keyboard, the client communicates a vector made up of position, direction, and speed to server. The vector manager relays this movement information to the remaining clients. Movement information may indicate movement within a two-dimensional plane. Speed may take one of only three values, such as walk, run, and stop. However, a person of ordinary skill in the art will realize that the movement information may be extended to include other movement information, such as up and down movement or six degrees of freedom movement, such as with a flight simulator.

Information sharing module 436 receives files to be shared from clients and stores the files in shared data storage 450. Information sharing module 436 then distributes these files to the appropriate participants. Shared data may be two-dimensional data, such as a word processing document, spreadsheet document, presentation document, or image file, or three-dimensional data, such as a product design or architectural design. Shared data may also consist merely of a uniform resource locator (URL). Three-dimensional data may be made up of 3D primitives stored in 3D object storage 440. Information sharing module 436 may communicate with 3D object server 432 to retrieve or update these 3D primitives. Information may be shared by direct transfer of data files from one participant's client computer to one or more other participants' client computers. Information may also be shared through a collaborative application sharing environment, as discussed below.

Shared data files may be accompanied by orientation information. The participant who initiates the sharing of a two-dimensional data file indicates how the file will be projected in the virtual workplace environment. For example, the file may be superimposed onto a wall or desktop. A word processing document may be displayed one or several pages at a time. When three-dimensional data is shared, a participant may indicate a three-dimensional position and direction. In an alternative embodiment, a 3D object may include shared data orientation information. For example, a wall object may include a presentation space in which two-dimensional data is to be projected.

Shared data files may also be accompanied by access control information. Access control may include, for example, ownership, authorship, viewership, monitorship, and blind. Ownership is given to the participant who initiates sharing of the data. Ownership may also be passed between parties as a form of file transfer with momentary sharing. Authorship allows a participant to modify the data as it exists in the virtual workplace environment. For example, a writer may present a document to an editor in a virtual workplace environment and assign the editor authorship access control. Viewership allows a participant to manipulate data without editing.

If participants are given viewership access control, each participant may, for example, view a different page of a word processing document. When participants are given monitorship control, they are forced to view the data as controlled by a person with ownership access control. For example, a participant may use slides during a lecture and give all other participants monitorship access control. When participants are given blind access control, they cannot see the shared data.

According to a preferred embodiment of the present invention, information sharing module 436 does not distribute the shared information to participants assigned blind access control. Blind access control may be used to hide confidential data from unauthorized participants. For example, a team leader may share specifications and assign team members authorship access control, while all other participants are assigned blind access control by default. Access control may be assigned to all participants, on an individual-by-individual basis, or by some other means, such as by rank or position.

According to a preferred embodiment of the present invention, information sharing module 436 creates an instance of a meeting in storage to keep track of the location of the meeting, such as a meeting room in the virtual workplace environment, and attendees. In addition to the access control, the information sharing module may store status information for the attendee, such for example as "presenting" for a participant that is controlling shared data for monitoring by other attendees, "contributing" for a participant that is currently modifying the shared data, or "away" for an attendee that is currently away from his or her client computer. A "presenting" or "contributing" status may be passed from one attendee to another to ensure that only one participant can modify shared data at a time, thus ensuring data integrity.

Voice server 438 receives voice information from each client and distributes this information to the remaining clients. When a participant initiates speech communication, such as by speaking into a microphone, the client communicates the speech in a known manner to the server. The voice server relays this voice information to the remaining clients. The voice server may also make a determination about to which participants voice information is to be distributed. For example, a participant may address speech to one or more participants. The voice server may also distribute voice information based on position. Voice server 438 may communicate with vector manager 434 to obtain location information for each participant to make this determination.

Figure 5:
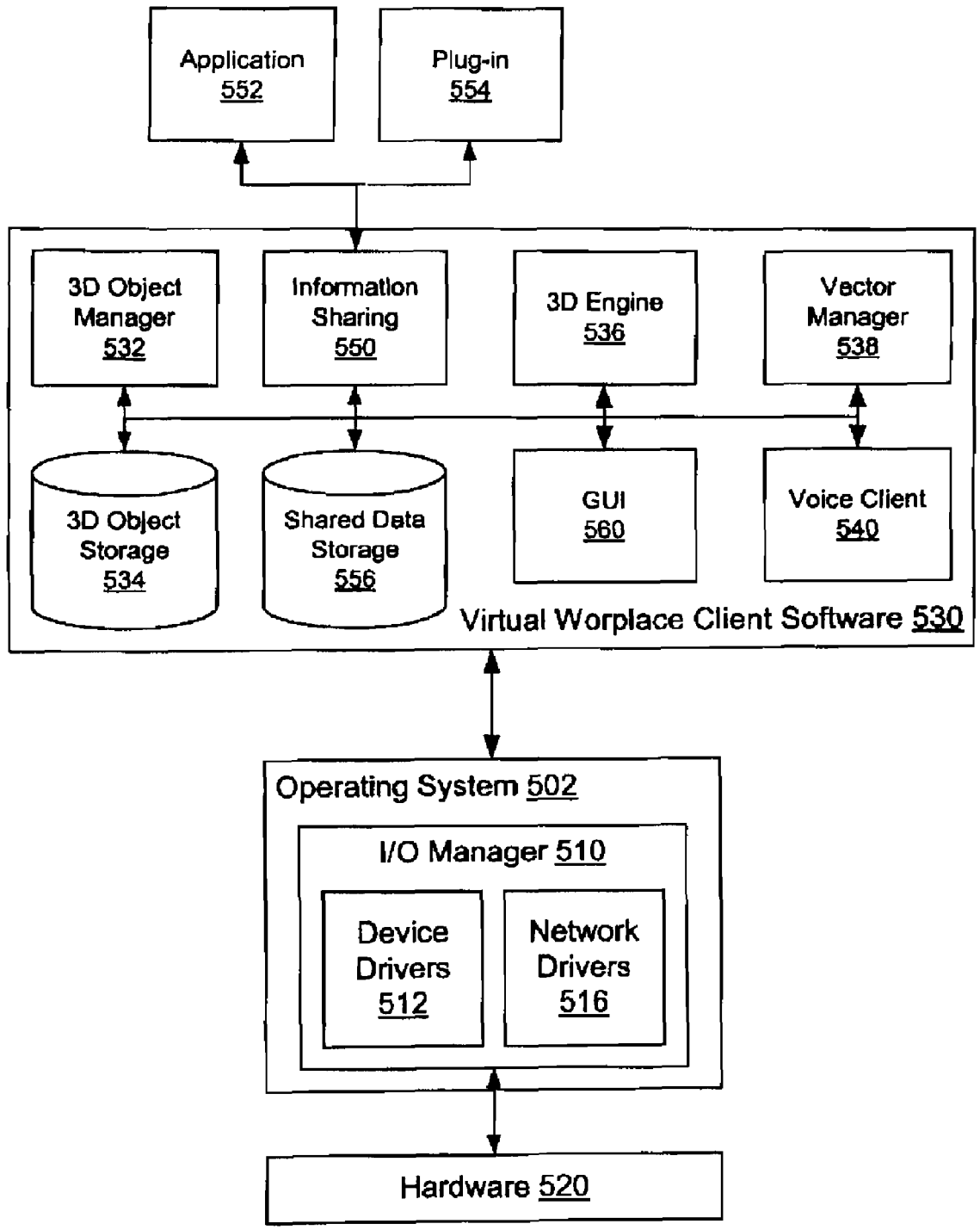
FIG. 5 is a block diagram illustrating the software organization within a virtual workplace client in accordance with a preferred embodiment of the present invention.

With reference now to FIG. 5, a block diagram is shown illustrating the software organization within a virtual workplace client in accordance with a preferred embodiment of the present invention. The organization shown may be embodied within virtual workplace clients 108, 110, 112 shown in FIG. 1. Operating system 502 communicates with virtual workplace client software 530. The operating system communicates with hardware 520 directly through input/output (I/O) manager 510. I/O manager 510 includes device drivers 512 and network drivers 514. Device drivers 512 may include a software driver for a printer or other device, such as a display, fax modem, sound card, etc. The operating system receives input from the user through hardware 520. Virtual workplace client software 530 sends information to and receives information from a network by communicating with network drivers 514 through I/O manager 510.

Virtual workplace client software 530 includes 3D object manager 532, 3D graphics engine 536, vector manager 538, and voice client 540. 3D object manager communicates with 3D object server 432 in virtual workplace server software 430 in FIG. 4 to retrieve all necessary 3D objects and updates, which are stored in 3D object storage 534 at the client. The 3D objects may also include primitives from which shared data models are built.

The 3D graphics engine receives 3D objects from 3D object storage 534 and vector information from vector manager 538. The 3D graphics engine then renders the 3D objects for display and gives the objects the appropriate position and movement based on the vector information. The 3D graphics engine also receives information sharing instructions from information sharing module 550 and shared data from shared data storage 556. The 3D graphics engine projects or applies shared two-dimensional data onto a surface of a 3D object according to the information sharing instructions. The 3D graphics engine also constructs shared three-dimensional data based on the information sharing data and the primitives in 3D object storage 534.

Vector manager 538 receives participant movement information in the form of vectors from the vector manager 434 in virtual workplace server software 430 in FIG. 4. Voice client 540 receives participant voice information from and sends participant voice information to voice server 438 in virtual workplace server software 430 in FIG. 4. When a participant is transmitting voice information to the server, the participant may indicate one or more recipients to whom the voice information is to be distributed. For example, a participant may indicate a single recipient for a one-to-one conversation.

Information sharing module 550 communicates shared files and instructions to and from information sharing module 436 in virtual workplace server software 430 in FIG. 4. Shared files received from the server are stored in shared data storage 556. In an alternate embodiment, shared three-dimensional files and new primitives are stored in 3D object storage 534.

In an alternate embodiment, vector manager 538, voice client 540, and information sharing module 550 may communicate directly with the client computers of the other participants connected to the server. The virtual workplace server then would be responsible for notifying each client of the internet protocol addresses of the other clients and when each client logs in or out of the server to enable this communication.

Information sharing module 550 communicates with 3D graphics engine 536 to indicate how the shared data is to be presented in the virtual environment. For example, if the shared file is an image file, information sharing module 550 may tell the 3D graphics engine to retrieve the image file from the shared data storage and to project the image file as a surface texture onto a particular 3D object, such as a wall in a conference room.

The information sharing module may also invoke application 552 to decode a file and determine the appearance of the data. For example, if the shared file is a word processing document, the information sharing module may invoke the word processing application to decode the file and determine the appearance of the data, given the margins, typeface, and line spacing, etc. Plug-in applications, such as plug-in 554 may be developed in a manner similar to web browser plug-in applications. Therefore, the information sharing module may invoke a plug-in, which is designed to work with the virtual workplace client software to decode the particular file type. The information sharing module may determine the file type in a known manner, such as by identifying a file extension. The shared data file may also contain data in an application "wrapper," similar to the manner in which a compressed file is "wrapped" in a decompression program to form a self-extracting executable.

Virtual workplace client software 530 includes a graphical user interface (GUI) 560, which allows the user to interface or communicate with virtual workplace client software 530. This interface provides for selection of various functions through menus and allows for manipulation of elements displayed within the user interface by use of a mouse. For example, a menu may allow a user to perform various functions, such as initiating information sharing, accessing shared data, exiting the software, and invoking a help function. GUI 560 may also include software buttons or a command line interface, which are known in the art.

Figure 6A:
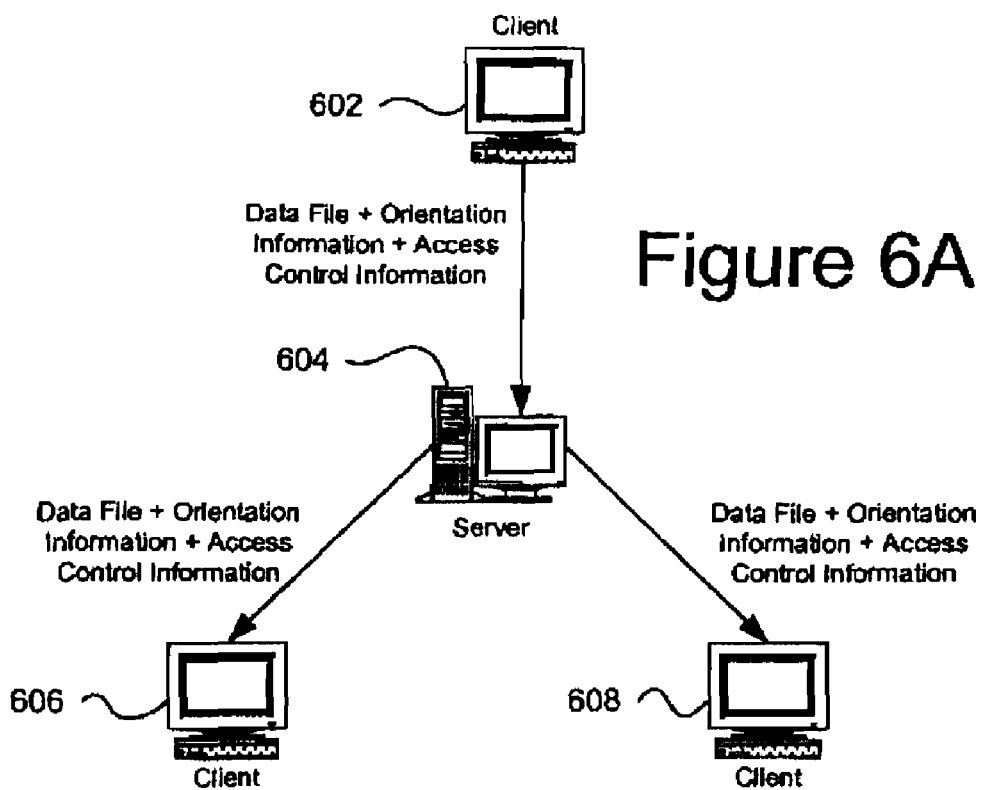
FIG. 6A is a data flow diagram illustrating an initiation of information sharing according to a preferred embodiment of the present invention.

With reference now to FIG. 6A, a data flow diagram is shown illustrating an initiation of information sharing according to a preferred embodiment of the present invention. Client 602 initiates information sharing and sends a data file, orientation information, and access control information to server 604. Based on the access control information, server 604 then distributes the data file, orientation information, and access control information to clients 606 and 608. The access control information may indicate that all participants have at least monitorship access control, in which case the server distributes the information to all clients. However, the access control information may also indicate that the participant at client 606 has, for example, viewership access control and that the participant at client 608 has blind access control. In this case, the server distributes the information to client 606, but not to client 608.

Figure 6B:
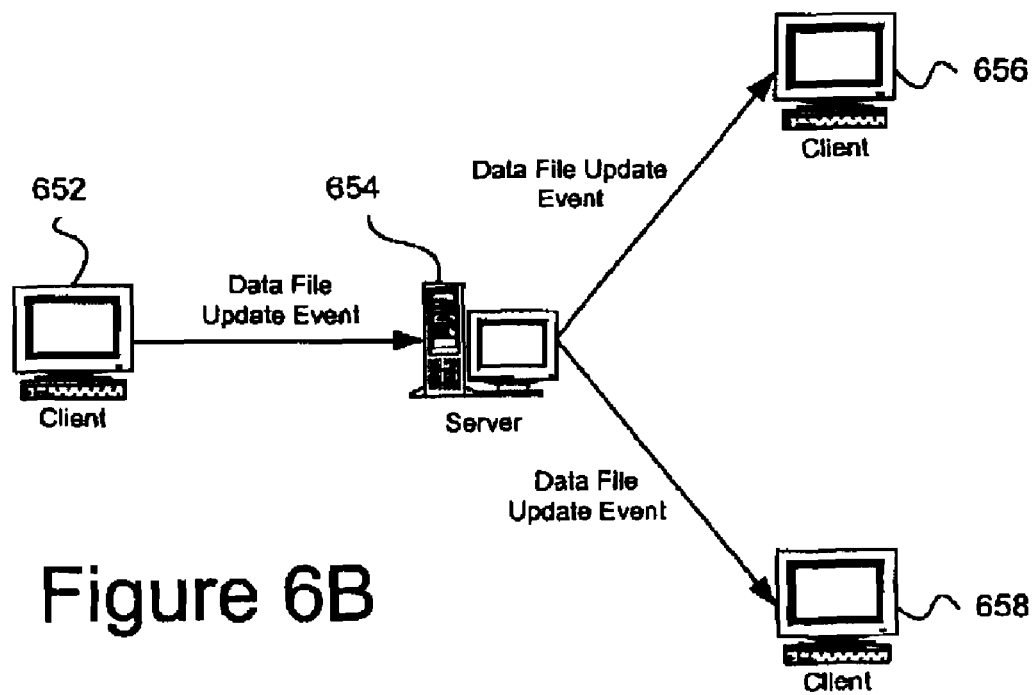
FIG. 6B is a data flow diagram illustrating an update of shared information according to a preferred embodiment of the present invention.

With reference to FIG. 6B, a data flow diagram is shown illustrating an update of shared information according to a preferred embodiment of the present invention. Client 652 has ownership or authorship access control and performs an access action on a shared data file, which results in a change to the shared data. Thus, client 652 sends a data file update event to server 654. A data file update event may consist of the modified data file, changes made to the data file, keystroke and mouse events, or other events as known in the art of collaboration and application sharing. Based on access control information, server 654 then distributes the data file update event to clients 656 and 658. Data file update events may consist only of navigational events. For example, the participant at client 652 may have ownership access control and is giving a presentation to participants, who have monitorship access control, at clients 656, 658. Client 652 may send only events, which indicate to the information sharing module to show the next page or slide. Client 652 may also send only events, which indicate to the information sharing module to rotate a 3D object about a vertical axis.

Figure 7A:
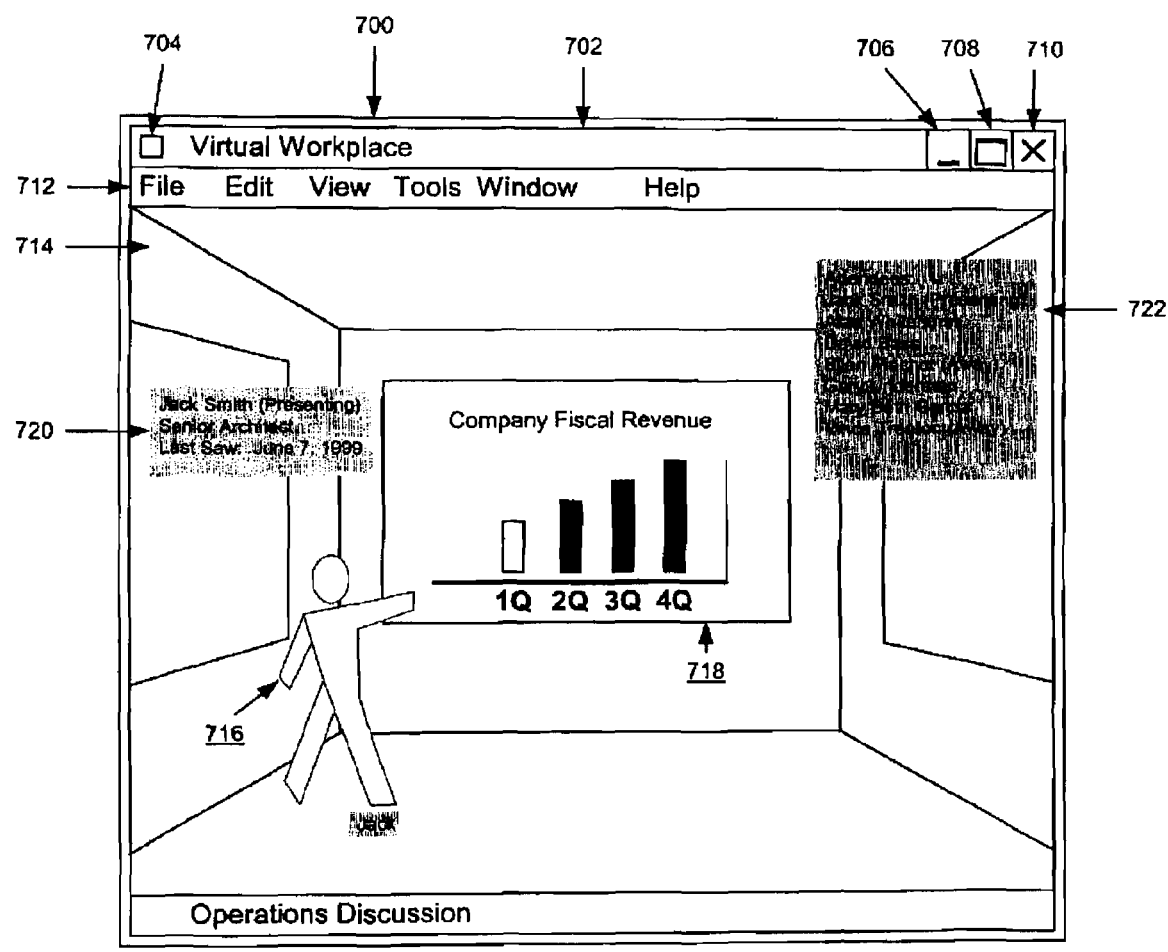
FIG. 7A is an example of a screen of display of two-dimensional data sharing in a virtual workplace environment in according to a preferred embodiment of the present invention.

An example of a screen of display of two-dimensional data sharing in a virtual workplace environment is shown in FIG. 7A according to a preferred embodiment of the present invention. The screen comprises window 700, including a title bar 702, which may display the title of a virtual workplace and the name of the application program. Title bar 702 also includes a control box 704, which produces a drop-down menu when selected with the mouse, and "minimize" 706, "maximize" or "restore" 708, and "close" 710 buttons. The "minimize" and "maximize" or "restore" buttons 706 and 708 determine the manner in which the program window is displayed. In this example, the "close" button 710 produces an "exit" command when selected. The drop-down menu produced by selecting control box 704 includes commands corresponding to "minimize," "maximize" or "restore," and "close" buttons, as well as "move" and "resize" commands.

Virtual workplace client window 700 also includes a menu bar 712. Menus to be selected from menu bar 712 may include "File", "Edit", "View", "Tools", "Window", and "help." However, menu bar 712 may include fewer or more menus, as will be understood by a person of ordinary skill in the art.

The virtual workplace client window displays the rendered virtual workplace environment in display area 714. The environment changes as the user moves the participant avatar by manipulation of cursor keys, for example. The display is rendered as a first-person perspective from the point of view of the user. In the example shown in FIG. 7A, the first-person view of the user includes participant avatar 716 and presentation space 718. A shared data file is projected onto the wall in display space 718. The user may target or select a participant, such as by clicking on avatar 716 with a mouse. Heads-up display 720 displays information about the participant who is controlling avatar 716. Heads-up display 722 displays information about the attendees of a current meeting.

Figure 7B:
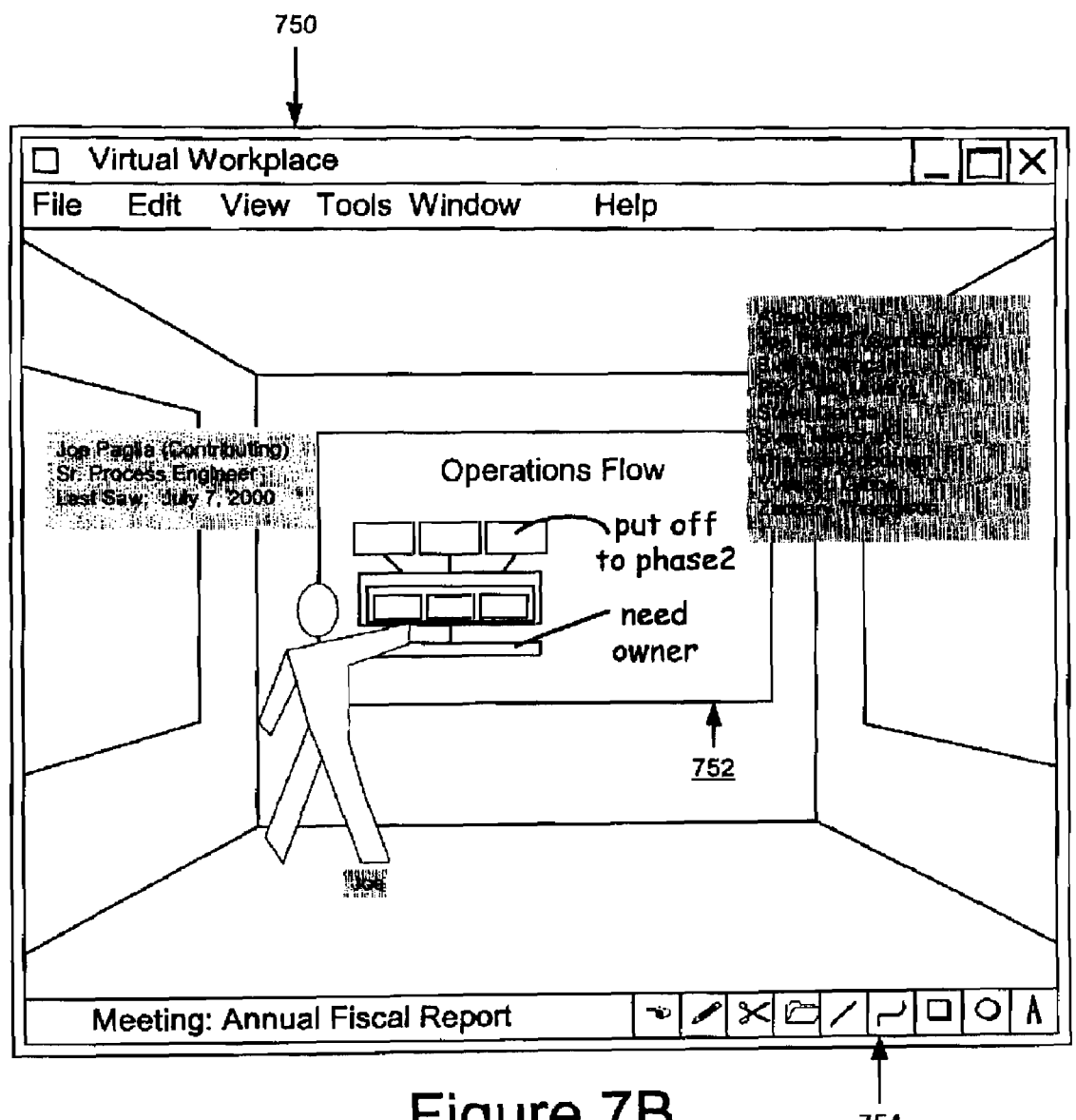
FIG. 7B is an example screen of display illustrating a virtual workplace environment with application sharing in accordance with a preferred embodiment of the present invention.

Turning now to FIG. 7B, an example screen of display is shown illustrating a virtual workplace environment with application sharing in accordance with a preferred embodiment of the present invention. Virtual workplace client window 750 includes a presentation space 752 in the display area on which is projected a shared application. For example, an image or drawing file may be created and projected onto presentation space. Participants may modify the shared data when given contributing status. The participant must also have at least authorship access control. Toolbar 754 provides buttons, which provide functions for modifying the shared data.

Figure 7C:
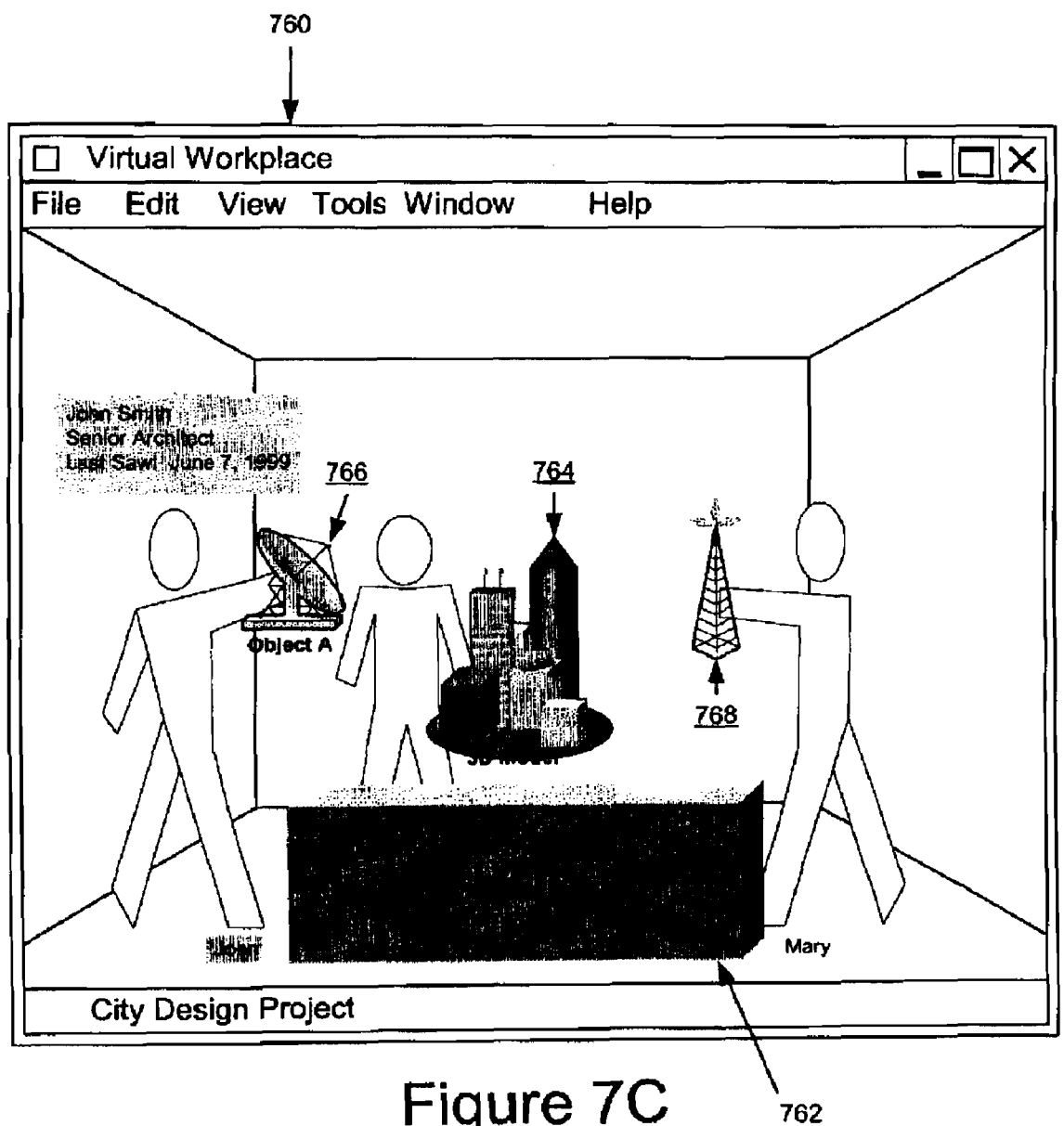
FIG. 7C is an example screen of display illustrating a virtual workplace environment in which three-dimensional data is shared according to a preferred embodiment of the present invention.

Turning now to FIG. 7C, an example screen of display is shown illustrating a virtual workplace environment in which three-dimensional data is shared according to a preferred embodiment of the present invention. Virtual workplace client window 760 includes a 3D application area 762 on which 3D data 764 is presented. Participants may contribute to shared 3D data by modifying the data or by adding 3D primitives or objects 766, 768. A participant may also control the presentation of 3D data 764 by rotating or moving it within the virtual workplace environment.

Figure 7D:
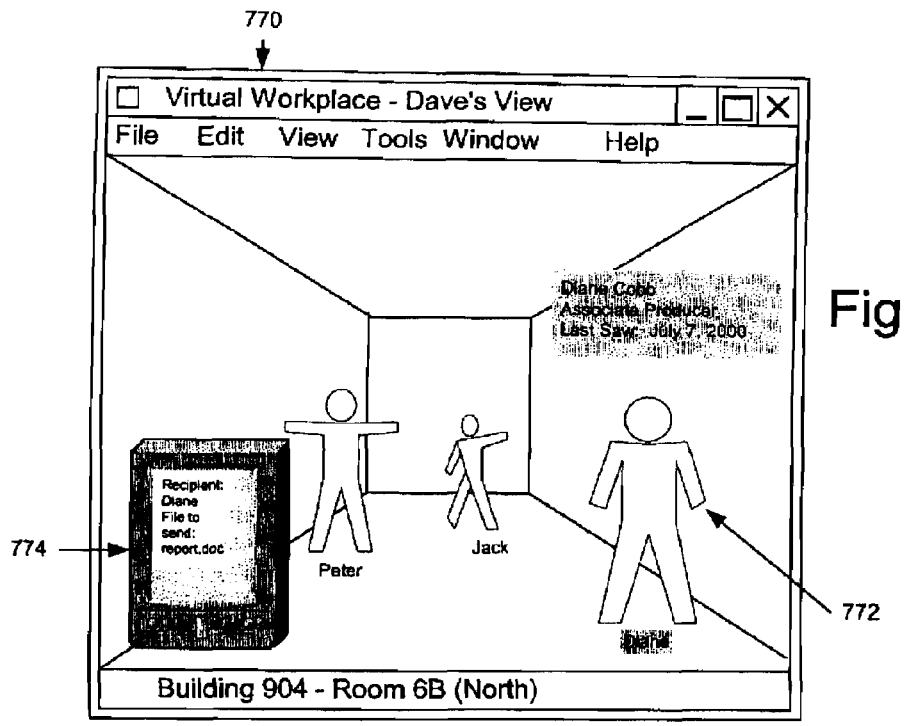
FIGS. 7D and 7E are example screens of display illustrating a virtual workplace environment in which a data file is transferred from one participant client computer to another in accordance with a preferred embodiment of the present invention.
Figure 7E:
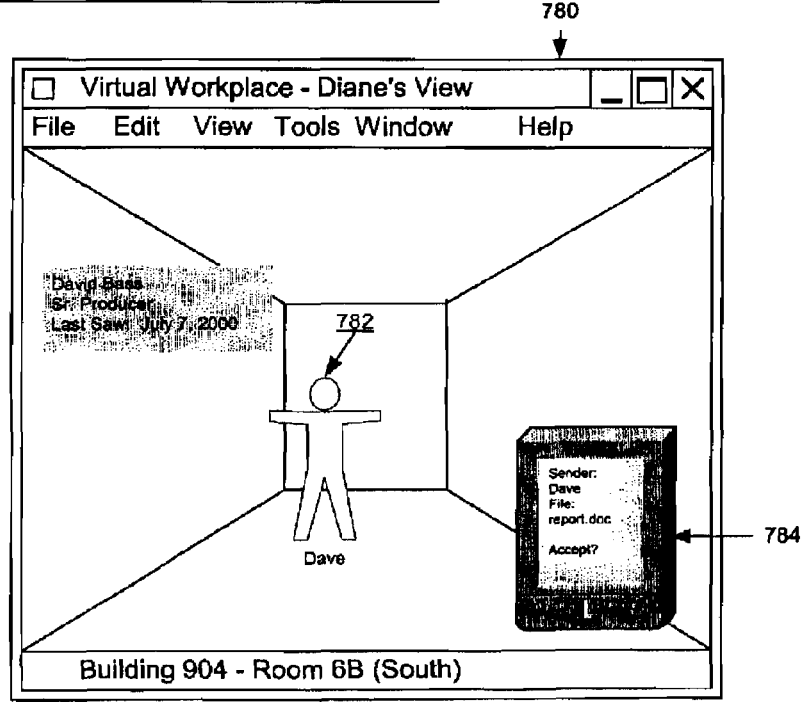

With reference to FIGS. 7D and 7E, example screens of display are shown illustrating a virtual workplace environment in which a data file is transferred from one participant client computer to another in accordance with a preferred embodiment of the present invention. Virtual workplace client window 770 shows a first-person view of a participant named Dave. A participant avatar 772 of a participant named Diane is in the field of view and is targeted. A virtual personal digital assistant (PDA) 774 provides functions for interaction with the targeted participant. The virtual PDA may be invoked by interaction with the GUI, such as by right clicking on the participant avatar or by a menu command. Virtual PDA 774 may be used to indicate the recipient and a file name from the participant client computer to transfer to the recipient.

Turning now to FIG. 7E, virtual workplace client window 780 shows a first-person view of the participant named Diane. A participant avatar 782 of the participant named Dave is in the field of view. In response to Dave initiating a file transfer, a virtual PDA 784 is displayed in window 780. The participant is prompted to accept or reject the file transfer through the virtual PDA.

Figure 8A:
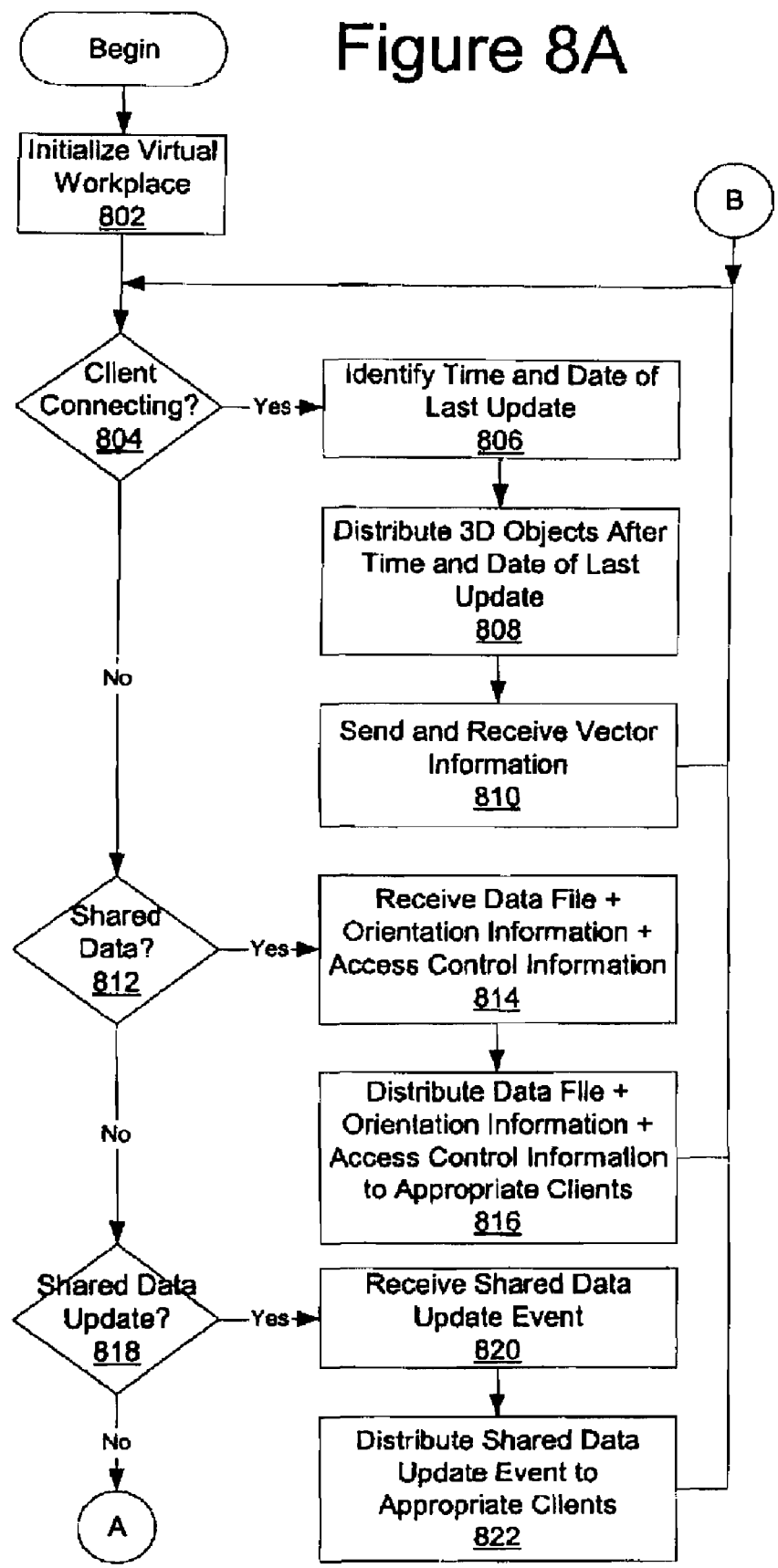

With reference now to FIGS. 8A and 8B, flowcharts are shown illustrating the general operation of a virtual workplace server in accordance with a preferred embodiment of the present invention. The process begins in FIG. 8A and the server initializes the virtual workplace (step 802). The server determines the state of the virtual environment upon startup, such as time of day and positions of moving objects, and prepares the 3D object server and vector manager accordingly.

Thereafter, a determination is made as to whether a client is logging into the server (step 804). If a client computer is logging into the virtual workplace server, the process identifies the time and date of the last 3D object update by the client machine (step 806). The server then distributes the 3D objects created or modified after the time and date of the last update (step 808), sends vector information for avatars already established in the virtual environment, and receives vector information for the location of the participant avatar associated with the client machine (step 810). Next, the process returns to step 804 to determine whether a client is logging into the virtual workplace server.

If a client is not logging into the server in step 804, a determination is made as to whether information sharing is being initiated by a client (step 812). If a client initiates information sharing, the process receives the data file, orientation information, and access control information from the client (step 814) and distributes this information to the appropriate participants (step 816). Thereafter, the process returns to step 804 to determine whether a client is logging into the virtual workplace server.

If a client is not initiating data sharing in step 812, a determination is made as to whether an update of shared data is received (step 818). If an update of shared data is received, the process receives the shared data update event (step 820) and distributes the shared data update event to the appropriate client computers (step 822). Then, the process returns to step 804 to determine whether a client is logging into the virtual workplace server.

If a shared data update is not received in step 818, the process proceeds to step 824 in FIG. 8B to determine whether a vector update is received. If a vector update is received, the process receives the vector information (step 826) and distributes the vector information to the client computers (step 828). Next, the process returns to step 804 to determine whether a client is logging into the virtual workplace server.

If a vector update is not received in step 824, a determination is made as to whether voice information is received (step 830). If voice information is received, the process receives the voice information (step 832) and distributes the voice information to appropriate client computers (step 834). Then, the process returns to step 804 to determine whether a client is logging into the virtual workplace server.

If voice information is not received in step 830, a determination is made as to whether a server shutdown is initiated (step 836). If a shutdown is initiated, the virtual workplace server software performs a shutdown procedure (step 838) and the process ends. The shutdown procedure is performed in a known manner and may consist of warning participants of the shutdown, saving the state of the system, and powering down the server.

If a shutdown is not initiated in step 836, a determination is made as to whether another action is initiated (step 840). Another action may be, for example, a resetting of the virtual workplace environment, a database backup, or periodic maintenance, as known in the art. Thereafter, the process returns to step 804 to determine whether a client is logging into the virtual workplace server.

Figure 9A:
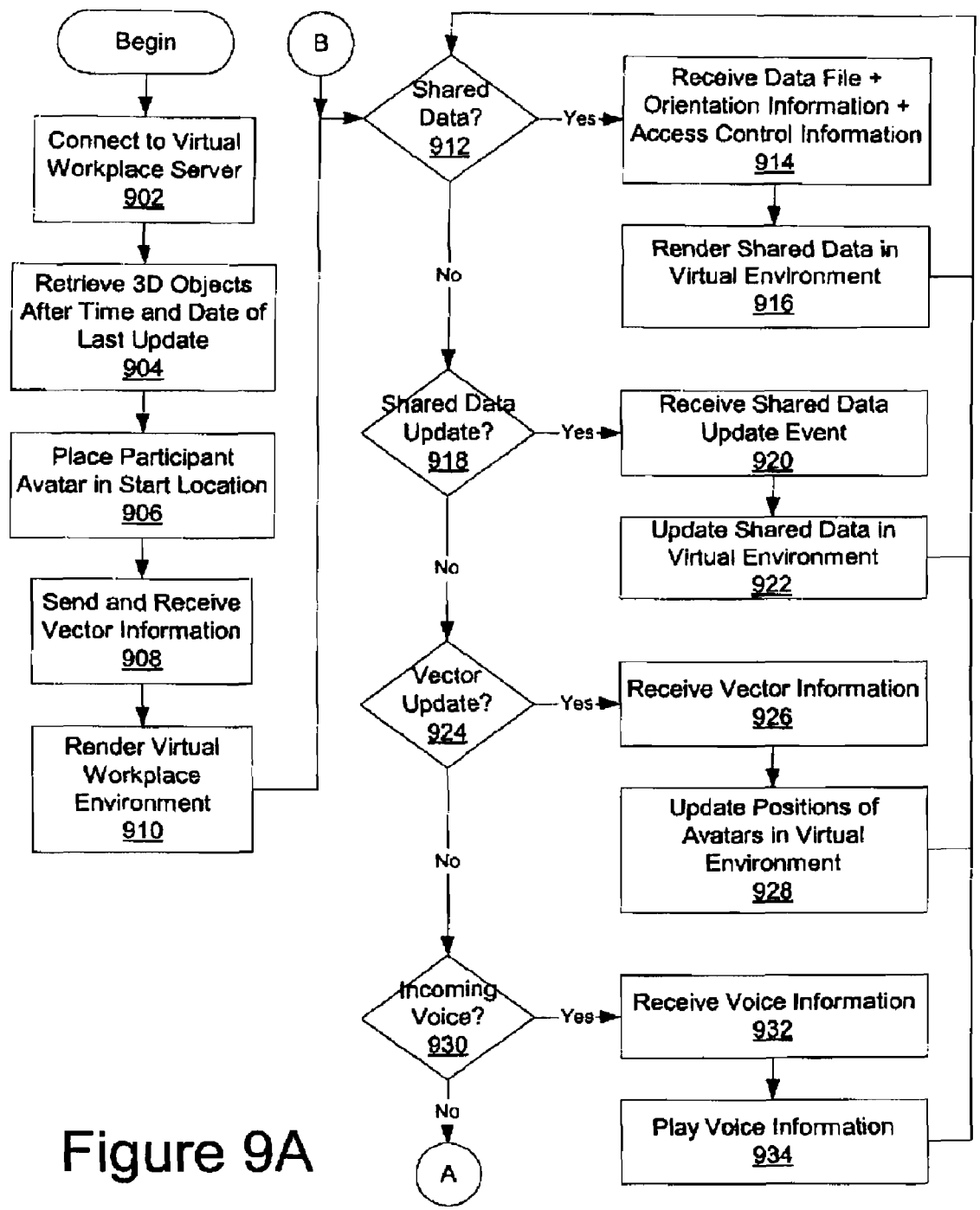
FIGS. 9A and 9B are flowcharts illustrating the general operation of a virtual workplace client in accordance with a preferred embodiment of the present invention.
Figure 9B:
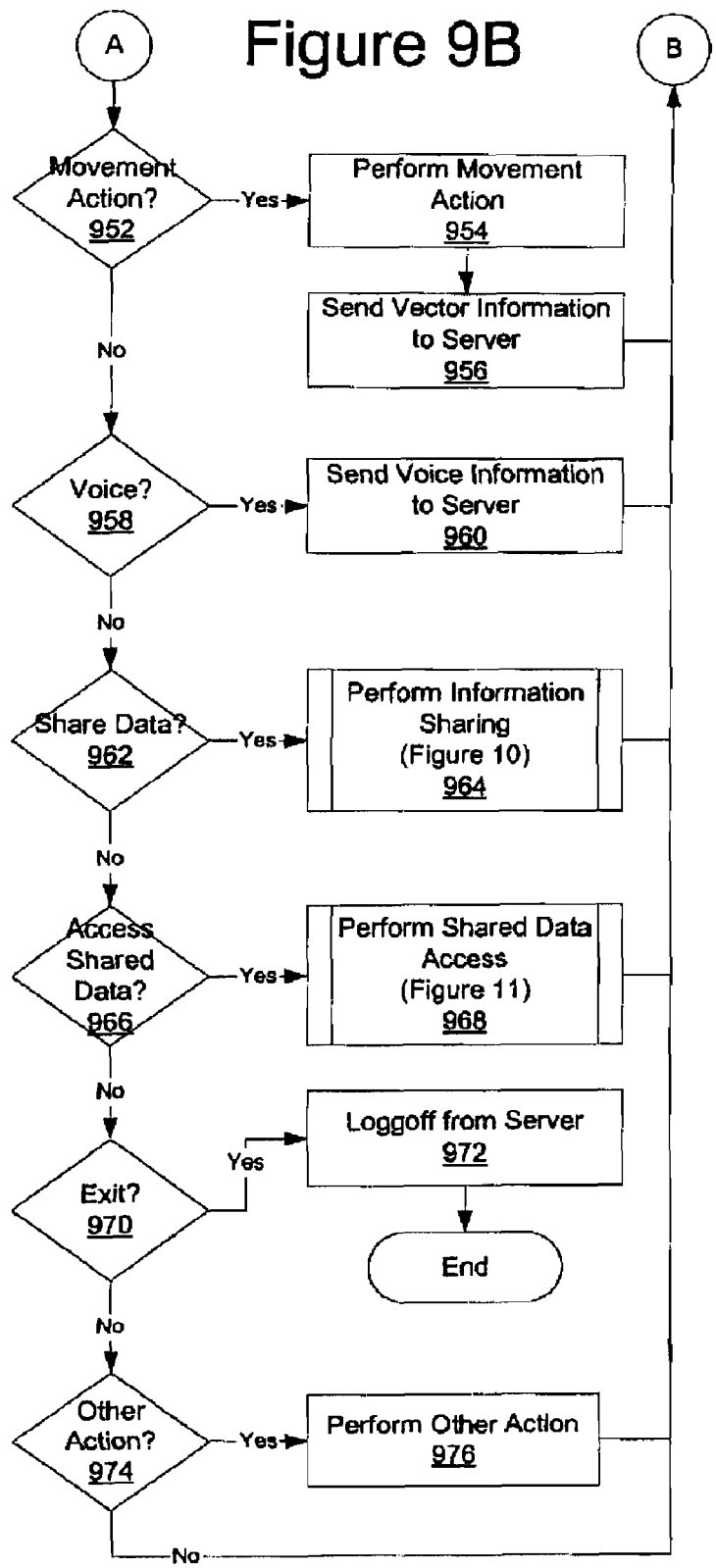

With reference to FIGS. 9A and 9B, flowcharts are shown illustrating the general operation of a virtual workplace client in accordance with a preferred embodiment of the present invention. The process begins in FIG. 9A and the client connects to a virtual workplace server (step 902). Then, the process retrieves 3D objects dated after the time and date of the last update (step 904) and places the user's participant avatar in a start location (step 906). The start location may be in the participant's virtual office or the location of the avatar at the last logoff.

Thereafter, the process sends the participant's vector information and receives vector information for the remaining participants (step 908). The process then renders the virtual workplace environment with the participant avatars (step 910). A determination is made as to whether a participant is initiating information sharing (step 912). If a participant is initiating information sharing, the process receives the data file, orientation information, and access control information (step 914). Next, the process projects the shared data into the rendered virtual environment according to the orientation information (step 916) and returns to step 912 to determine whether a participant is initiating information sharing.

If a participant is not initiating information sharing in step 912, a determination is made as to whether a shared data update is received (step 918). If a shared data update is received, the process receives the shared data update event (step 920) and updates the shared data as projected in the virtual environment (step 922). Then, the process returns to step 912 to determine whether a participant is initiating information sharing.

If a shared data update is not received in step 918, a determination is made as to whether a vector update is received from the server (step 924). If a vector update is received, the process receives the vector information (step 926) and updates the positions of the avatars in the virtual environment (step 928). Next, the process returns to step 912 to determine whether a participant is initiating information sharing.

If a vector update is not received in step 924, a determination as made as to whether incoming voice is received from the server (step 930). If voice is received, the process receives the voice information (step 932), plays the voice information (step 934) and returns to step 912 to determine whether a participant is initiating information sharing. If voice is not received in step 930, the process proceeds to step 952 in FIG. 9B to determine whether the user initiates a movement action. If the user initiates a movement action, the process performs the movement action in the 3D engine (step 954) and sends a vector update to the server (step 956). Then, the process returns to step 912 to determine whether a participant is initiating information sharing.

If the user does not initiate a movement action in step 952, a determination is made as to whether the user is generating voice information (step 958). If the user is generating voice information, the process sends the voice information to the server (step 960) and returns to step 912 to determine whether a participant is initiating information sharing.

If the user is not generating voice information in step 958, a determination is made as to whether the user is initiating information sharing (step 962). If the user is initiating information sharing, the process performs a data sharing process (step 964) and returns to step 912 to determine whether a participant is initiating information sharing. The operation of the information sharing process is described in more detail below with respect to FIG. 10.

If the user is not initiating information sharing in step 962, a determination is made as to whether the user is initiating access of shared data (step 966). If the user is initiating access of shared data, the process performs a shared data access process (step 968) and returns to step 912 to determine whether a participant is initiating information sharing. The operation of the shared data access process is described in more detail below with respect to FIG. 11.

If the user is not initiating access of shared data in step 966, a determination is made as to whether an exit instruction is received from the user (step 970). If an exit instruction is received, the process performs a logoff from the server and ends (step 972). Then, the process returns to step 912 to determine whether a participant is initiating information sharing.

If an exit instruction is not received in step 970, a determination is made as to whether another action is initiated by the user (step 974). An action may be any action initiated by interaction with the GUI, by keystroke commands, or by a command line interface, such as a help function. Avatar interactions, such as waving and bowing, and participant management, such as keeping a "friends" list or "ignore" list, are known in the video game art and may be implemented in the present invention. If the user initiates an action, the process performs the action (step 976) and returns to step 912 to determine whether a participant is initiating information sharing. If the user does not initiate an action in step 974, the process proceeds directly to step 912 to determine whether a participant is initiating information sharing.

Figure 10:
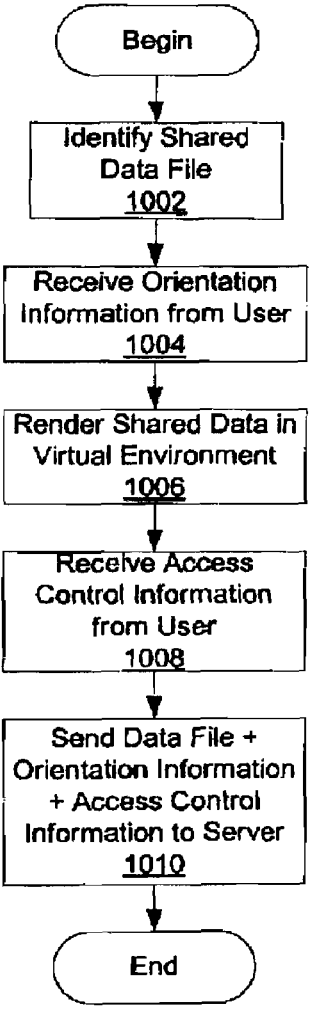
FIG. 10 is a flowchart illustrating the operation of an information sharing process according to a preferred embodiment of the present invention.

With reference now to FIG. 10, a flowchart is shown illustrating the operation of an information sharing process according to a preferred embodiment of the present invention. The process begins and identifies a shared data file (step 1002). Then, the process receives orientation information from the user (step 1004) and renders the shared data in the virtual environment (step 1006). Next, the process receives access control information (step 1008), sends the data file, orientation information, and access control information to the server (step 1010) and ends.

With reference to FIG. 11, a flowchart is shown illustrating the operation of a shared data access process according to a preferred embodiment of the present invention. The process begins and a determination is made as to whether the user has sufficient access control to perform the requested access action (step 1102). If the user does not have sufficient access control, the process notifies the user of insufficient access control (step 1104) and ends.

If the user has sufficient access control in step 1102, the process performs the access action (step 1106) and a determination is made as to whether the shared data file is updated in the action (step 1108). If the shared data file is not updated, the process ends. For example, if the action is to change the page or perform a zoom action and the participant has viewership access control, the data file is not updated.

If the data file is updated in step 1108, the process generates a data file update event (step 1110), sends the data file update event to the server (step 1112) and ends. For example, if the action modifies the file by performing an editing function or if the participant has control over the shared data and other participants have monitorship access control, the data file is updated and a data file update event is generated.

The present invention places participants in the same virtual environment and allows them to share information as they would in a real world setting. Thus, the participants may speak to and interact with other participants as if they are in the same room. The present invention achieves the further advantage of allowing participants to share information in a manner, which is impossible in the real world. For example, participants may attend a meeting from a remote setting. Participants may also walk freely around a three-dimensional model and make modifications, thus providing real-time presentation and collaboration. The environment may be designed to suit the occasion. For example, the size of a conference room may be increased to account for more attendees.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, in an alternative embodiment of the present invention, the virtual workplace server is modified to decode shared data and to send the display information, orientation information, and access control information to the clients. The virtual workplace server may then invoke an external program, such as an application program, a plug-in, or a wrapper application, to decode the data. The server may also receive file modifications from the clients, decode the modifications or make the modifications in the invoked external program, and distribute updated display information to the clients. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, comprising:
    rendering a three-dimensional environment from the perspective of a first participant, the three-dimensional environment including an avatar representing a second participant;
    receiving a selection of the avatar from the first participant;
    receiving a selection of a file to be transferred from the first participant;
    sending a transfer request to the second participant;
    receiving an acceptance from the second participant; and
    transferring the file from the data processing system to a client computer associated with the second participant, without routing the file through a server facilitating the meeting, wherein the step of transferring the file to a client computer is performed in response to receiving the acceptance.

2. An apparatus, comprising:
    rendering means for rendering a three-dimensional environment from the perspective of a first participant, the three-dimensional environment including an avatar representing a second participant;
    first receipt means for receiving a selection of the avatar from the first participant;
    second receipt means for receiving a selection of a file to be transferred from the first participant;
    means for sending a transfer request to the second participant;
    means for receiving an acceptance from the second participant; and
    transfer means for transferring the file from the data processing system to a client computer associated with the second participant, without routing the file through a server facilitating the meeting, wherein the transfer means transfers the file to the client computer in response to the means for receiving the acceptance.

3. A computer program product, in a recordable-type medium, comprising:
    instructions for rendering a three-dimensional environment from the perspective of a first participant, the three-dimensional environment including an avatar representing a second participant;
    instructions for receiving a selection of the avatar from the first participant;
    instructions for receiving a selection of a file to be transferred from the first participant;
    instructions for sending a transfer request to the second participant;
    instructions for receiving an acceptance from the second participant; and
    instructions for transferring the file from the data processing system to a client computer associated with the second participant, without routing the file through a server facilitating the meeting, wherein the instructions for transferring the file to a client computer are performed in response to receiving the acceptance.

* * * * *